United States Patent [19]

Hayashi et al.

[11] Patent Number: 4,640,066
[45] Date of Patent: Feb. 3, 1987

[54] VEHICLE WINDOW STRUCTURE

[75] Inventors: Motomu Hayashi, Okazaki; Masayuki Nagai, Aichi; Shigeru Akoshima, Toyota, all of Japan

[73] Assignee: Toyota Jidosha Kabushiki Kaisha, Japan

[21] Appl. No.: 739,388

[22] Filed: May 30, 1985

[30] Foreign Application Priority Data

Jun. 11, 1984 [JP] Japan ............................ 59-86555[U]

[51] Int. Cl.$^4$ ................................................ E06B 3/00
[52] U.S. Cl. ........................................ 52/208; 52/397; 52/400; 52/745; 29/526 R; 277/184; 296/84 D
[58] Field of Search ................ 52/208, 397, 400, 745; 296/84 A, 84 D, 93; 277/184; 29/526 R

[56] References Cited

U.S. PATENT DOCUMENTS

| | | | |
|---|---|---|---|
| 3,155,204 | 11/1964 | Campbell et al. | 52/208 |
| 3,774,363 | 11/1973 | Kent | 52/208 |
| 4,139,234 | 2/1979 | Morgan | 52/208 |
| 4,161,851 | 7/1979 | Inamoto et al. | 52/400 |
| 4,165,083 | 8/1979 | Dochnahl | 277/184 |

FOREIGN PATENT DOCUMENTS 2024753  12/1971  Fed. Rep. of Germany ........ 52/400

Primary Examiner—John E. Murtagh
Assistant Examiner—Caroline Dennison
Attorney, Agent, or Firm—Parkhurst & Oliff

[57] ABSTRACT

This invention relates to a vehicle window structure. The vehicle window structure includes a window glass, a body member, a window molding, a retainer for the window molding and a seal member between the window glass and body member. The window molding is in contact with the window glass and the body member. The window molding is fixed on the retainer which supports the seal member. Accordingly, the window molding, retainer and seal member are united to form a sealing assembly which is secured to the window glass before the window glass is fixed on the vehicle body. Further, the retainer has an engagement portion which can engage with the body member. Thus, the window glass and its sealing assembly can be attached to the body member in a simple one-step operation.

12 Claims, 5 Drawing Figures

PRIOR ART

VEHICLE WINDOW STRUCTURE

BACKGROUND OF THE INVENTION

The present invention relates to a vehicle window structure which seals a passenger compartment from an outside or exterior environment of a vehicle. More particularly, the present invention relates to improvements in a window glass seal member disposed between the window glass and the outer body member. The window glass seal member obviates the installation problems encountered with known devices.

FIG. 5 shows a cross-sectional view of a conventional vehicle window structure taken along the line II—II of FIG. 1. In the conventional vehicle window structure, a surface 12 of a conventional seal member 10 is disposed on an inner surface 42 in the vicinity of a lower peripheral edge 44 of the window glass 40. Another surface 14 of the conventional seal member 10 is disposed on an outer surface 22 in the vicinity of an upper edge 24 of the outer body member 20. The upper edge 24 of the outer body member 20 defines a lower peripheral edge of a vehicle window opening. The conventional seal member 10 is fitted in the vicinity of the upper edge 24 of the outer body member 20, and is usually made of a butyrated resin.

An inner body member 90 is in contact with an inner surface 21 of the outer body member 20. The outer body member 20 has a hole 26 in the vicinity of the upper edge 24 thereof, and the inner body member 90 has a corresponding hole 92 in the vicinity of an upper edge thereof. The hole 26 of the outer body member 20 is congruent with the hole 92 of the inner body member 90. A retainer 80 is fixed on the outer body member 20 through a bolt and a nut. The bolt is inserted into a hole 82 of the retainer 80, the hole 26 of the outer body member 20 and the hole 92 of the inner body member 90. The retainer 80 has a flange 84 on which a window molding 50 is mounted through a screw 52. An upper edge 54 of the window molding 50 is in contact with an outer surface 46 of the window glass 40, and a lower edge 56 of the window molding 50 is in contact with the outer body member 20. The window molding 50 improves the aesthetic appearance around the window glass 40.

A packing 70 is disposed between the outer surface 22 of the outer body member 20 and an inner surface 86 of the retainer 80 for preventing the retainer 80 from hitting or contacting the outer surface 22 of the outer body member 20. The packing 70 is disposed under the conventional seal member 10, and a space is defined between the packing 70 and the conventional seal member 10. If the conventional seal member 10 is mounted on the packing 70, the sealing effect of the seal member 10 is detracted. Because, an area of the another surface 14 of the conventional seal member 10 is reduced, and a gap is defined between the another surface 14 of the conventional seal member 10 and the packing 70. Accordingly, the upper edge 24 of the outer body member 20 extends considerably upward beyond the hole 26 to provide the space between the packing 70 and seal member 10. As a result, a vehicle cannot have a large window, and a wide field of view for passengers cannot be obtained.

The installation procedure for installing the conventional window structure is cumbersome. When these components are installed on the body member, first of all, the packing 70 is first fixed on the outer body member 20 and the conventional seal member 10 is then mounted on the outer surface 22 of the outer body member 20. Thereafter the door glass 40 is mounted on the conventional seal member 10. Finally, the window molding 50 and the retainer 80 are fixed on the outer body member 20 by the bolt and the nut.

Accordingly, the packing 70, the conventional seal member 10, the window molding 50 and the retainer 80 are separated from the window glass 40, so that these components must be installed piece by piece. As a result, installation entails a substantial amount of time and effort.

Another type of conventional window structure is disclosed in U.S. Pat. No. 4,165,083 to Dochnakl. The '083 patent discloses sealing member having two side-by-side oppositely facing channels, one of which surrounds a peripheral edge of a window glass, while the other fits over a flange surrounding the window opening of the vehicle. The window and sealing member are first installed on the vehicle and then retaining clips are secured to the vehicle body to press the sealing member and glass against the flange. Thereafter, a decrative beading cover is attached to the retainer.

The '083 patent suffers from many of the disadvantages noted in connection with the window structure of FIG. 5. For example, the installation process of the window structure disclosed in U.S. Pat. No. 4,165,083 is cumbersome since it entails a piece-by-piece installation. In addition, the flange of the '083 patent must have a height sufficient to support the channel of the sealing member, the height of the flange thus decreasing the field of view through the window.

SUMMARY OF THE INVENTION

The present invention was developed in view of the foregoing background and to overcome the foregoing drawbacks. It is accordingly an object of this invention to provide a seal member which can be installed easily on a vehicle by a factory worker.

To achieve such easy installation of a window glass, the present invention provides a seal member and a window molding which are mounted on the window glass, before the window glass is mounted on the vehicle. Further, the seal member is provided with a lower extension for preventing a retainer from hitting the outer surface of the outer body member.

In accordance with the present invention, the seal member includes a head portion and a packing portion both of which cooperate with a retainer. The head portion of the seal member has an outer surface, an inner surface and a recess located between the inner and outer surfaces. The packing portion of the seal member extends downward from the head portion along an inside surface of the retainer. An upper edge of a retainer is inserted into the recess of the head portion of the seal member, and a bolt is inserted into aligned holes in the packing portion of the seal member and in the retainer. Accordingly, the retainer and the bolt are assembled with the seal member.

Further, the window molding is fixed on the retainer by a screw. The retainer, seal member and window molding are assembled together or united to form a sealing assembly. The window glass is sandwiched between the window molding and the head portion of the seal member. Accordingly, the retainer, the bolt, the seal member, and the window molding are assembled as a unit in the vicinity of the peripheral edge of the window glass, before the window glass is mounted on the body member.

Therefore, when the bolt is inserted into a hole of the body member and the bolt is secured by a nut, the window glass is securely mounted on the body member. By providing a seal member according to this invention, much less time and labor is expended to install the window glass. This provides for increased productivity and decreased production costs. Thus, this invention is a significant contribution to the industry.

Further, the seal member in accordance with the present invention is not separated from the packing, so that it is not necessary to provide a space between the seal member and the packing. Accordingly, the upper edge 24 of the outer body member 20 extends upward to a lesser extent than conventional vehicle window structures. As a result, a vehicle can have a large window, and a wide field of view for passengers.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF THE PREFERRED EMBODIMENTS

The present invention will be described in detail with reference to the accompanying drawings which illustrate different embodiments of the present invention.

Figure 1:
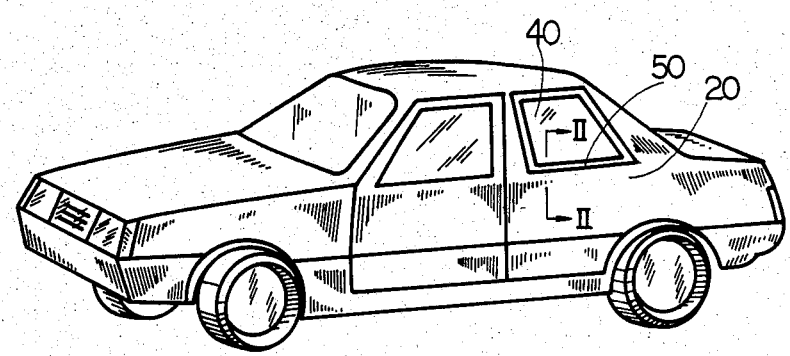
FIG. 1 is a perspective view of a vehicle.

Referring to FIG. 1, a window glass 40 is mounted on an outer body member 20, and a window molding 50 is mounted on an outer peripheral portion of the window glass and an inner peripheral portion of the body member 20.

Figure 2:
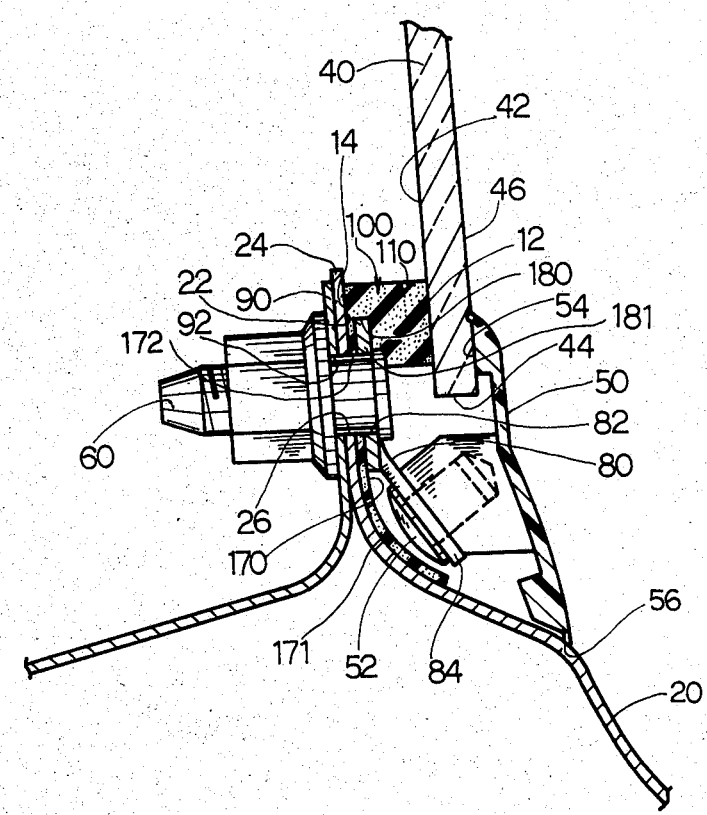
FIG. 2 is an enlarged cross-sectional view of a vehicle window structure according to the present invention, taken along the line II—II in FIG. 1.

As shown in FIG. 2, the outer peripheral portion of the window glass 40 is sandwiched between the window molding 50 and a head portion 110 of a seal member 100. The seal member 100 includes the head portion 110 and a packing portion 170. The head portion 110 of the seal member 100 has an outer surface 12, an inner surface 14 and a recess 180 therebetween. The packing portion 170 has a hole 172 therein. A bolt 60 is inserted into a hole 82 of a retainer 80 and the hole 172 of the seal member 100, and an upper portion of the retainer 80 is inserted into the recess 180.

Accordingly, the bolt 60 and the retainer 80 are assembled with the seal member 100 prior to installment on the vehicle. Once installed, the seal member 100 will serve a dual function of sealing a space between a window glass 40 and retainer 80, and providing a packing 170 between the retainer 80 and the outer body member 20.

Further, the window molding 50 is fixed on a flange 84 of the retainer 80 by a screw 52. An outer peripheral edge 44 of the window 40 is inserted between an edge 54 of the window molding 50 and the outer surface 12 of the head portion 110 of the seal member 100. The outer surface 12 of the seal member 100 is in contact with an inner surface 42 of the window glass 40. The edge 54 of the window molding 50 is in contact with an outer surface 46 of the window glass 40.

Accordingly, before the window glass 40 is mounted on the outer body member 20, the seal member 100, the retainer 80, the bolt 60 and the window molding 50 are assembled into a sealing assembly located about the outer peripheral edge 44 of the window glass 40. The window glass 40 and sealing assembly form a vehicle window structure which is then attached to the vehicle body by inserting the bolt 60 through the hole 26 of the outer body member and the hole 92 of the inner body member 90, and fixing the bolt 60 with a nut or other suitable fastener. Therefore, the window structure of the window glass 40, seal member 100, retainer 80, bolt 60 and window molding 50 are secured to the vehicle in a relatively simple, one-step process.

The packing portion 170 has a lower extention 171 which, extends downwardly underneath at least a lower end of the flange 84 of the retainer 80, so that the packing portion 170 can protect the outer body member 20 from being hit by the retainer 80 or the screw 52.

When the bolt 60 is inserted into a hole 26 of the outer body member 20 and a hole 92 of an inner body member 90, and the bolt 60 is securely fixed on the outer body member 20 by a nut, an opposite edge 56 of the window molding 50 is in contact with the outer body member 20. Accordingly, the aesthetic appearance of the window glass 40 is improved. In this condition, the inner surface 14 of the head portion 110 and the packing portion 170 of the seal member 100 are in contact with an outer surface 22 of the outer body member 20.

Figure 3:
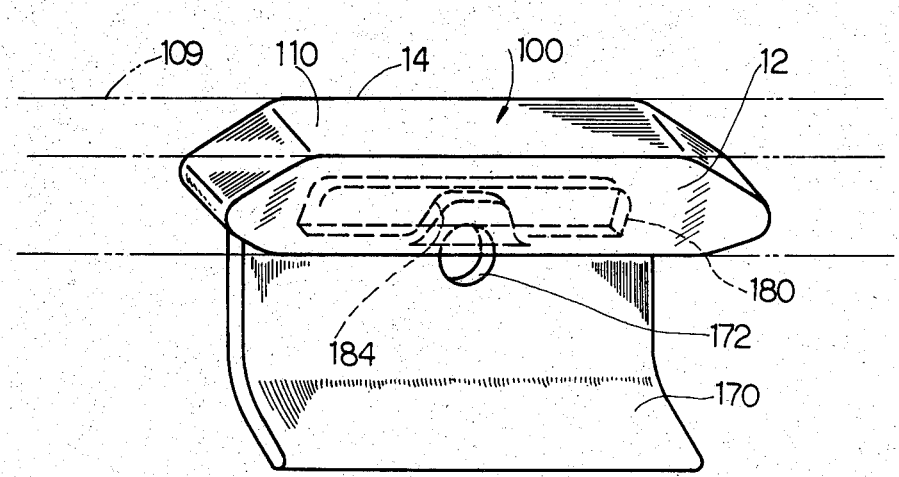
FIG. 3 is an exploded perspective view of a seal member and retainer in accordance with a first embodiment of the invention.
Figure 3:
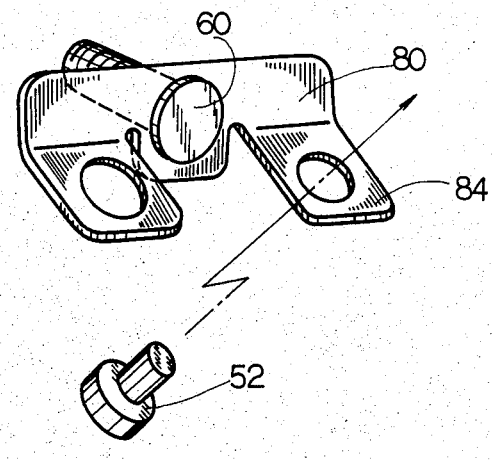
Figure 5:
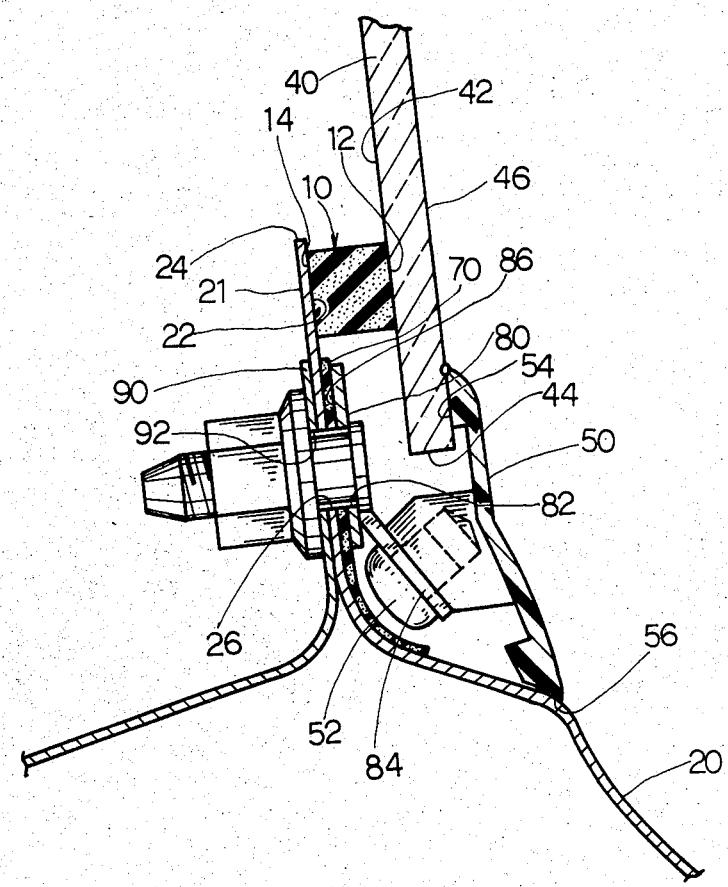
FIG. 5 is an enlarged cross-sectional view of a conventional vehicle window structure, taken along the line II—II in FIG. 1.

As shown in FIG. 3, the head portion 110 of the seal member 100 includes an expanded portion 184 of the recess 180, and a portion of the bolt 60 is inserted into the expanded portion 184 of the recess 180. Accordingly, a distance defined between the bolt 60 and an upper end of the seal member 100 is shorter than the distance of a conventional vehicle window structure shown in FIG. 5.

Therefore, a vertical distance of a mounting portion of the outer body member 20 for mounting the seal member 100 is narrower than the vertical distance of a mounting portion of the conventional vehicle window structure. Accordingly, an inner peripheral edge 24 of the outer body member 20 is lower than conventional window structures, and thus improves passenger visability by permitting a larger window opening.

Further, the seal member 100 is fixed on the outer body member 20 by the bolt 60, so that the seal member 100 seals more securely between the outer surface 22 of the outer body member 20 and the window glass 40 than the conventional vehicle window structure.

It is apparent to one skilled in the art that the head portion 110 of the seal member 100 may extend completely along the inner peripheral edge 24 of the outer body member 20. Further, the head portion 110 of the seal member 100 may be mounted only in the vicinity of the retainer 80, and an another seal member 109 shown by a broken line in FIG. 3 may extend along the other portion of the inner peripheral edge 24 of the outer body member 20. The ends of the head portion 110 of the seal member 100 may connect to ends of adjacent seal members 109. The seal member 100 may be sponge rubber, and the adjacent member 109 may be made of a butyrated resin. The packing portion 170 of the seal member 100 may be made of an elastic unfoamed rubber. In addition, the packing portion 170 of the seal member 100 may be enlarged as shown in FIG. 3.

Figure 4:
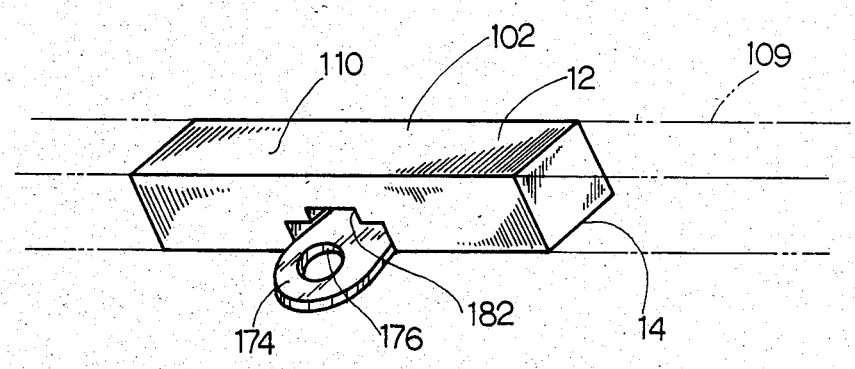
FIG. 4 is an enlarged perspective view of the seal member in accordance with a second embodiment of the invention.

A second embodiment of a seal member 102 is shown in FIG. 4. The second embodiment is substantially similar to the first embodiment disclosed in FIG. 3. However, the major difference between the seal member 102 shown in FIG. 4 and the seal member 100 shown in FIG. 3 is that a packing portion 174 of the seal member 102 is smaller than the packing portion 170 of the seal member 100. The packing portion 174 of the seal member 102 has an area which covers only the vicinity of the bolt 60.

As described herein, the present invention provides a seal member affixed to a window glass prior to installing the window glass on a body member. The present invention thus simplifies the window glass installment procedure, while forming an adequate seal and increasing passenger visibility.

While the present invention has been described in its preferred embodiments, it is to be understood that the invention is not limited thereto, and may be otherwise embodied within the scope of the following claims.

What is claimed is:

1. A sealing assembly for attachment to a window glass prior to insertion within a window opening of a vehicle body, said assembly comprising:
   a retainer having a flange;
   a window molding secured to said flange, said window molding having a first edge and a second opposite edge, each edge having an inner surface;
   a seal member secured to said retainer, said seal member including a sealing portion and a packing portion extending from the sealing portion, said sealing portion having an inner surface and an outer surface opposing said inner surface of said first edge of said window molding and defining a space therebetween for receiving a peripheral edge of said window glass such that said inner surface of said first edge contacts an outer surface of said window glass, and said outer surface of said seal member contacts an inner surface of said window glass; and
   fastening means on said retainer for securing said window glass to said vehicle body after said retainer, window molding and seal member are attached to said window glass, said packing portion of said seal member being located between said fastening means and said vehicle body.

2. A sealing assembly of claim 1, wherein said sealing portion of said seal member includes a recess for receiving a portion of said retainer.

3. The sealing assembly of claim 1, wherein said fastening means secures said packing portion of said seal member to said retainer, said packing portion being located between said retainer and said vehicle body when said window glass is secured to said vehicle body.

4. A sealing assembly of claim 3, wherein said packing portion includes an extension that extends toward said flange such that said extension is located between said flange and vehicle body when said window glass is attached to said vehicle body.

5. A sealing assembly of claim 3, wherein said packing portion includes an opening for reception of said fastening means to secure said seal member to said retainer.

6. The sealing assembly of claim 5, wherein said opening in said packing portion is aligned with a hole in said vehicle body, said fastening means being inserted through said aligned opening and hole to secure said window glass to said vehicle body.

7. A method for installing a window glass in a window opening of a vehicle body, said method comprising the steps of:
   providing a sealing assembly of a retainer having a flange, a window molding attached to said flange and having a first edge and a second opposite edge, and a seal member secured to said retainer, and having an outer surface opposing said first edge of said window molding and a packing portion extending from said seal member;
   attaching said window molding and seal member to said retainer to construct said sealing assembly;
   attaching said sealing assembly to said window glass prior to inserting said window glass into said window opening, the attaching of said sealing assembly to said window glass including inserting a peripheral edge of said window glass between said outer surface of said seal member and said first edge of said molding; and
   fastening said retainer to said vehicle body to secure said window glass and sealing assembly to said vehicle body and simultaneously locating said packing portion between said retainer and said vehicle body.

8. A method of claim 7, wherein the providing step for providing a sealing assembly comprises the first step of inserting a portion of said retainer into a recess defined within said seal member.

9. A method of claim 8, wherein the providing step for providing a sealing assembly comprises the second step of inserting a fastening means into an opening defined within a packing portion extending from said seal member and a hole defined within said retainer, after said first inserting step.

10. A method of claim 9, wherein the providing step for providing a sealing assembly comprises the step of fixing said window molding to the flange of said retainer, after said second inserting step.

11. A sealing assembly for attachment to window glass prior to insertion within a window opening of a vehicle body, said assembly comprising:
    a retainer including a flange and a fastening means;
    a window molding secured to said flange, said window molding having a first edge and a second opposite edge, each edge having an inner surface; and
    a seal member secured to said retainer, said seal member including a sealing portion and a packing portion, said packing portion including an opening for reception of said fastening means to secure said seal member to said retainer, said opening in said packing portion being aligned with a hole in said vehicle body, said fastening means being inserted through said aligned opening and hole to secure to said window glass to said vehicle body, said packing portion being located between said retainer and said vehicle body once the window glass is secured to said vehicle body, said seal member having an inner surface and an outer surface opposing said inner surface of said first edge of said window molding and defining a space therebetween for receiving a peripheral edge of said window glass such that said inner surface of said edge contacts an outer surface of said window glass, and said outer surface of said seal member contacts an inner surface of said window glass, said outer surface of said seal member being located on said sealing portion.

12. A method for installing a window glass in a window opening of a vehicle body, said method comprising the steps of:

providing a sealing assembly of a retainer having a flange, a window molding attached to said flange and having a first edge and a second opposite edge, and a seal member secured to said retainer, and having an outer surface opposing said first edge of said window molding, forming said sealing assembly by inserting a portion of said retainer into a recess defined within said seal member and inserting a fastening means into an opening defined within a packing portion extending from said seal member and a hole defined within said retainer;

attaching said sealing assembly to said window glass prior to inserting said window glass into said window opening, the attaching of said sealing assembly to said window glass including inserting a peripheral edge of said window glass between said outer surface of said seal member and said first edge of said molding; and fastening said retainer to said vehicle body to secure said window glass and sealing assembly to said vehicle body.

* * * * *